United States Patent
Misada

(10) Patent No.: US 6,666,790 B2
(45) Date of Patent: Dec. 23, 2003

(54) TOROIDAL TYPE CONTINUOUSLY VARIABLE TRANSMISSION

(75) Inventor: Yasuharu Misada, Kashiwara (JP)

(73) Assignee: Koyo Seiko Co., Ltd., Osaka (JP)

( * ) Notice: Subject to any disclaimer, the term of this patent is extended or adjusted under 35 U.S.C. 154(b) by 0 days.

(21) Appl. No.: 09/937,928

(22) PCT Filed: Jan. 30, 2001

(86) PCT No.: PCT/JP01/00607

§ 371 (c)(1),
(2), (4) Date: Oct. 2, 2001

(87) PCT Pub. No.: WO01/57417

PCT Pub. Date: Aug. 9, 2001

(65) Prior Publication Data

US 2002/0155918 A1 Oct. 24, 2002

(30) Foreign Application Priority Data

Feb. 2, 2000 (JP) .......................................... 2000-25485

(51) Int. Cl.⁷ .............................................. F16H 13/10
(52) U.S. Cl. .............................. 476/41; 476/10; 476/73; 477/45
(58) Field of Search ................................ 476/41, 4, 73, 476/2, 3, 9, 10, 40, 42, 46; 477/45, 46, 47, 48, 49; 701/60, 61

(56) References Cited

U.S. PATENT DOCUMENTS

| 5,338,268 A | 8/1994 | Greenwood | |
|---|---|---|---|
| 5,842,945 A | * 12/1998 | Inoue | 475/207 |
| 6,050,917 A | * 4/2000 | Gierling et al. | 477/45 |
| 6,387,009 B1 | * 5/2002 | Haka | 476/11 |

FOREIGN PATENT DOCUMENTS

| JP | 54-92749 | 6/1979 |
| JP | 59-17163 | 1/1984 |
| JP | 60-188308 | 12/1985 |
| JP | 63-62954 | 3/1988 |
| JP | 64-18663 | 1/1989 |
| JP | 6-257662 | 9/1994 |
| JP | 7-208567 | 8/1995 |
| JP | 7-259948 | 10/1995 |
| JP | 9-112683 | 5/1997 |

\* cited by examiner

*Primary Examiner*—David Fenstermacher
(74) *Attorney, Agent, or Firm*—Rabin & Berdo, PC

(57) ABSTRACT

A toroidal type continuously variable transmission includes a pair of discs (5, 10) in opposed relation, and a rotary element (17) interposed in a toroidal clearance (S) defined between these discs (5, 10). Torque is transmitted between the pair of discs (5, 10) via the rotary element (17). Sensing the velocity of the rotary element (17) permits the determination of, for example, how much the rotary element (17) slips on the discs (5, 10). This assists the prevention of heat-up of the rotary element (17) and also provides an optimal traction between the rotary element (17) and the discs (5, 10).

14 Claims, 11 Drawing Sheets

TOROIDAL TYPE CONTINUOUSLY VARIABLE TRANSMISSION

TECHNICAL FIELD

The present invention relates to a toroidal type continuously variable transmission provided with a rotary element at a toroidal clearance defined between an input disc and an output disc such that torque is transmitted between the discs via the rotary element.

BACKGROUND ART

As disclosed in Published Japanese Translation of PCT International Publication for Japanese Patent Application No. 6(1994)-502476, the toroidal continuously variable transmission of this type is arranged such that grouped rotary elements of variable orientation transmit traction between matching part-toroidal type races formed on the confronting faces of coaxial and contra-rotating input and output discs. The input disc and output disc include center holes through which an input shaft, connected to a prime mover, extends. The input disc is connected with the input shaft in a manner to rotate in unison, whereas the output disc is rotatably carried on the input shaft.

A rotary velocity transmitted from the input disc to the output disc is varied with change of the orientation of the rotary elements. Specifically, when the rotary elements contact the input disc at a relatively high radius and the output disc at a relatively low one, the output disc rotates faster than the input disc and a variator is set at a high gear ratio.

When, on the other hand, the rotary elements contact the input disc at a relatively low radius and the output disc at a relatively high one, the output disc rotates slower than the input disc and the variator is set to a low gear ratio.

The rotary element is normally rotatably supported by a carriage extended orthogonally to a rotary shaft of the rotary element, an axis of the carriage is inclined at a predetermined caster angle relative to a plane including a torus center circle.

The input disc and output disc are urged by a hydraulic cylinder along a direction to come closer to each other, whereas the rotary element is also urged against the races of the discs by a hydraulic cylinder via the carriage supporting the same. Oil pressures generated by these hydraulic cylinders are controlled so that a force may be applied to the rotary element via the carriage for balancing the torque received by the rotary element. Thus, the roller angle is changed to strike a balance between the torque of the output disc and that of the input disc, thereby to maintain an appropriate torque ratio.

In practice, the roller receives a specific torque load according to any one of combinations of various essential parameters (e.g., requirement of an operator, engine load, engine velocity, final output velocity and the like). Therefore, a control system is designed to receive input representative of all the essential parameters and to set up within the hydraulic cylinder an appropriate oil pressure to match a reaction torque received by the roller in order to maintain an appropriate torque ratio between the input disc and the output disc.

On the other hand, a lubricant is directly jetted onto a rolling surface at a periphery of the rotary element for lubricant supply thereby allowing the rotary element to roll smoothly on the race.

In the prior art, the velocity of the rotary element is not sensed so that there has been provided no measure against the fear of abnormal behavior of the rotary element. This is because the sensing of the rotary velocities of the input disc and output disc permits the determination of a speed change ratio but not the determination of how much the rotary element slips on the discs. If, for example, the rotary element keeps working at an increased slip ratio, frictional heat will be generated to heat the rotary element as well as to evaporate the lubricant on the races, thus resulting in an abnormality such as flaking of the races. Furthermore, the oil between contact surfaces of the rotary element and the disc is heated to decrease traction and hence, a lowered transmissibility of the transmission results.

In order to meet a demand for the greatest possible reduction of size and weight of the toroidal type continuously variable transmission for use in vehicles, the discs and rollers must be downsized, as well.

However, if a required torque is to be transmitted under such conditions, contact pressure between the disc and the rotary element is increased. Particularly, when decreased in surface area as a result of the compact design, the rotary element is lowered in heat releasability. Hence, the temperature of the rotary element will rise to accelerate the deterioration of the lubricant. This leads to a fear of producing race flaking.

It is an object of the invention to provide a toroidal type continuously variable transmission designed to prevent the heat-up of the rotary element as well as to achieve the improvement of transmissibility and the reduction of size and weight.

DISCLOSURE OF THE INVENTION

For achieving the above objects, a preferred embodiment of the invention comprises a pair of discs in opposed relation; a rotary element disposed in a toroidal clearance defined between the discs for transmission of torque between the disc pair; and means for sensing the velocity of the rotary element.

The embodiment permits the monitoring of an actual velocity of the rotary element, thus contributing to the prevention of occurrence of abnormal behavior thereby avoiding the heat-up of the rotary element. As a result, the reduction of size and weight can be implemented in the toroidal type continuously variable transmission.

More preferably, the embodiment may further comprises a means for sensing the velocity of the disc and a signal output means for outputting a signal based on results given by the means for sensing the velocity of the rotary element and the means for sensing the velocity of the disc. The greatest factor for the heat-up of the rotary element is slippage of the rotary element against the disc. The slippage also affects traction at a contact portion between the rotary element and the disc. The embodiment enables the acquisition of information on the slippage of the rotary element and hence, the heat-up of the rotary element may be prevented more positively. Furthermore, the information on the slippage of the rotary element may be used to provide an optimal control of the traction at the contact portion between the rotary element and the disc so that the transmission may be improved in transmissibility.

It is preferred that the rotary element is formed with a plurality of raised/depressed portions on a side face thereof. In this case, the raised/depressed portions contribute to the increased surface area of the rotary element such that the rotary element may be improved in heat releasability for prevention of the heat-up thereof. This eliminates the fear of producing the race flaking due to the deterioration of the lubricant even if the rotary element and discs are downsized. Thus, the raised/depressed portions practically contribute to the reduction of size and weight of the continuously variable transmission. The raised/depressed portions may include at least one type of projections, recesses and through holes. It is particularly preferred that the raised/depressed portions are arranged with equal spacing and along a circumference about a rotary axis of the rotary element.

BEST MODES FOR CARRYING OUT THE INVENTION

Preferred embodiments of the invention will be described with reference to the accompanying drawings.

Figure 1:
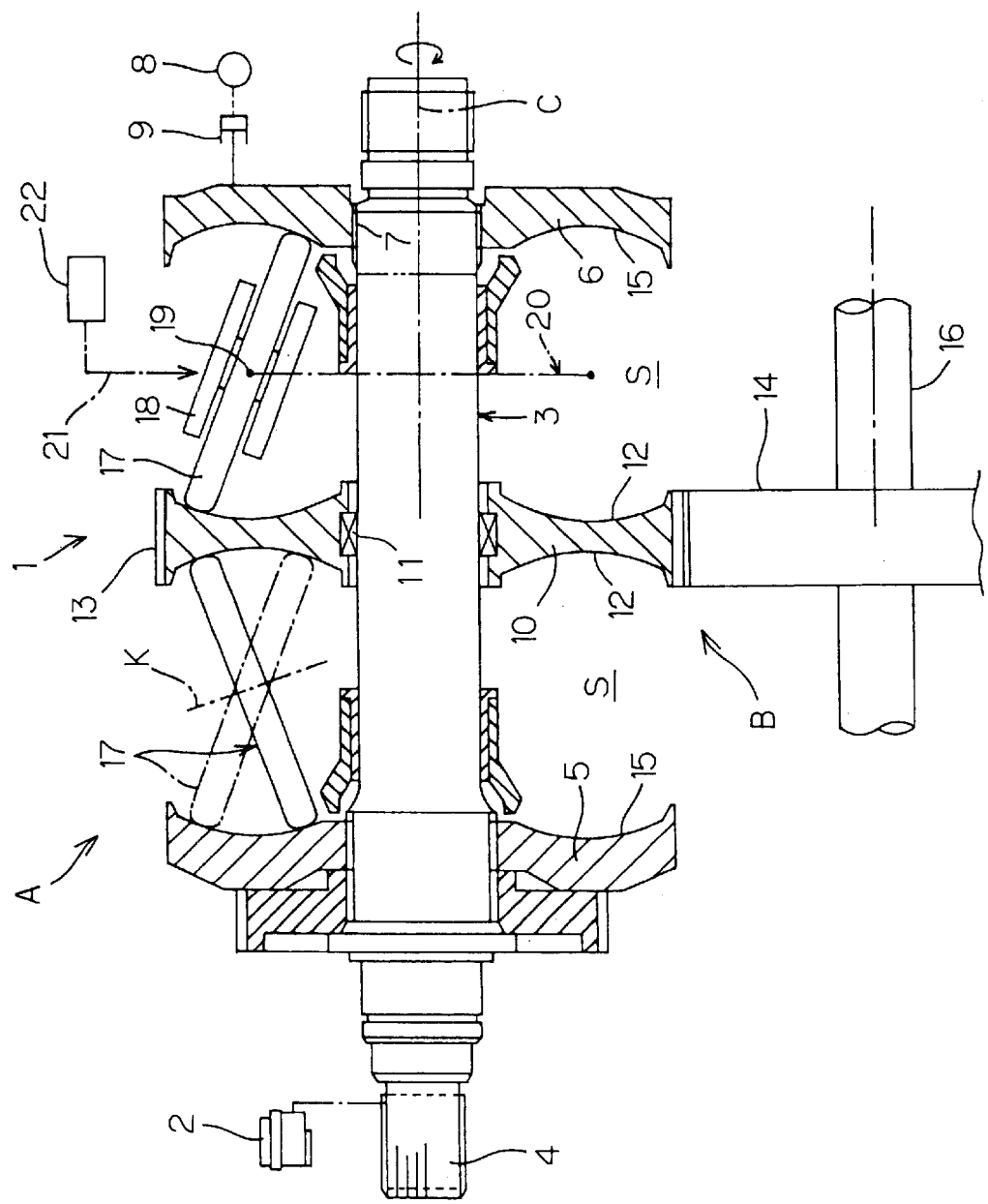
FIG. 1 is a partly broken schematic diagram showing a toroidal type continuously variable transmission according to one embodiment of the invention.

FIG. 1 is a schematic sectional view showing a toroidal type continuously variable transmission according to one embodiment of the invention. Referring to FIG. 1, a variator 1 of the present continuously variable transmission A includes an input shaft 3 driven by a prime mover 2 of a vehicle. The input shaft 3 is formed with a spline 4 at one end thereof for connection with the prime mover 2. The input shaft 3 carries thereon input discs 5, 6 at places near opposite ends thereof. The input discs 5, 6 are connected with the input shaft 3 via a key 7 such that the input discs 5, 6 are prevented from rotating relative to the input shaft 3. The keyed connection allows for limited relative axial movement between the input shaft 3 and the input discs 5, 6, such that a hydraulic cylinder 9 connected with an appropriate hydraulic power source 8 may urge the input disc 6 towards the other input disc 5, thereby applying a required "end load" to the variator 1. It is noted that the keyed connection may be replaced by spline connection.

A ring output disc 10 is rotatably carried on the input shaft 3 at an axial midportion thereof via a roll bearing 11, the output disc constituting an output portion of the variator 1. The output disc 10 is formed with part-toroidal races 12 on opposite side faces thereof. The output disc is also formed with gear teeth 13 on its periphery. An output shaft 16, which is integrally rotatably assembled with a gear 14 with gear teeth meshed with the gear teeth 13, extends in parallel with the input shaft 3. The gear teeth 13 and gear 14 constitute a gearing mechanism B for transmission of torque from the output disc 10 to the output shaft 16. The rotation of the output shaft 16 is adapted to be transmitted to drive wheels of the vehicle.

A part-toroidal clearance S is defined between each of the races 12 of the output disc 10 and each corresponding input disc 5, 6. Traction is transmitted between a part-toroidal race 15 of each input disc 5, 6 and a part-toroidal race 12 on the output disc 10 by means of grouped rollers 17 as rotary element. The roller 17 is carried by a carriage 18 as allowed to rotate about a rotary axis K.

Although plural roller/carriage sets are interposed between the input disc 5 and the output disc 10, FIG. 1 depicts only one set thereof. Likewise, the figure depicts only one roller/carriage set between the input disc 6 and the output disc 10. In practice, a set of three rollers are normally disposed between the disc pair, the three rollers being arranged with equal spacing and along a circumference about a centre axis C of the input shaft 3. The orientations of the six rollers are all controlled by a common oil-pressure control unit so that the rollers may transmit an equal speed change ratio at all times while under drive.

A centre 19 of each roller 17 is designed to be positioned on an imaginary centre circle 20 of a common torus of the races 12, 15 but, in operation, is allowed to travel a limited distance back and forth along this circle. A hydraulic circuit 21 includes a hydraulic cylinder 22 for controlling the orientation of the roller 17 via the carriage 18.

Figure 2:
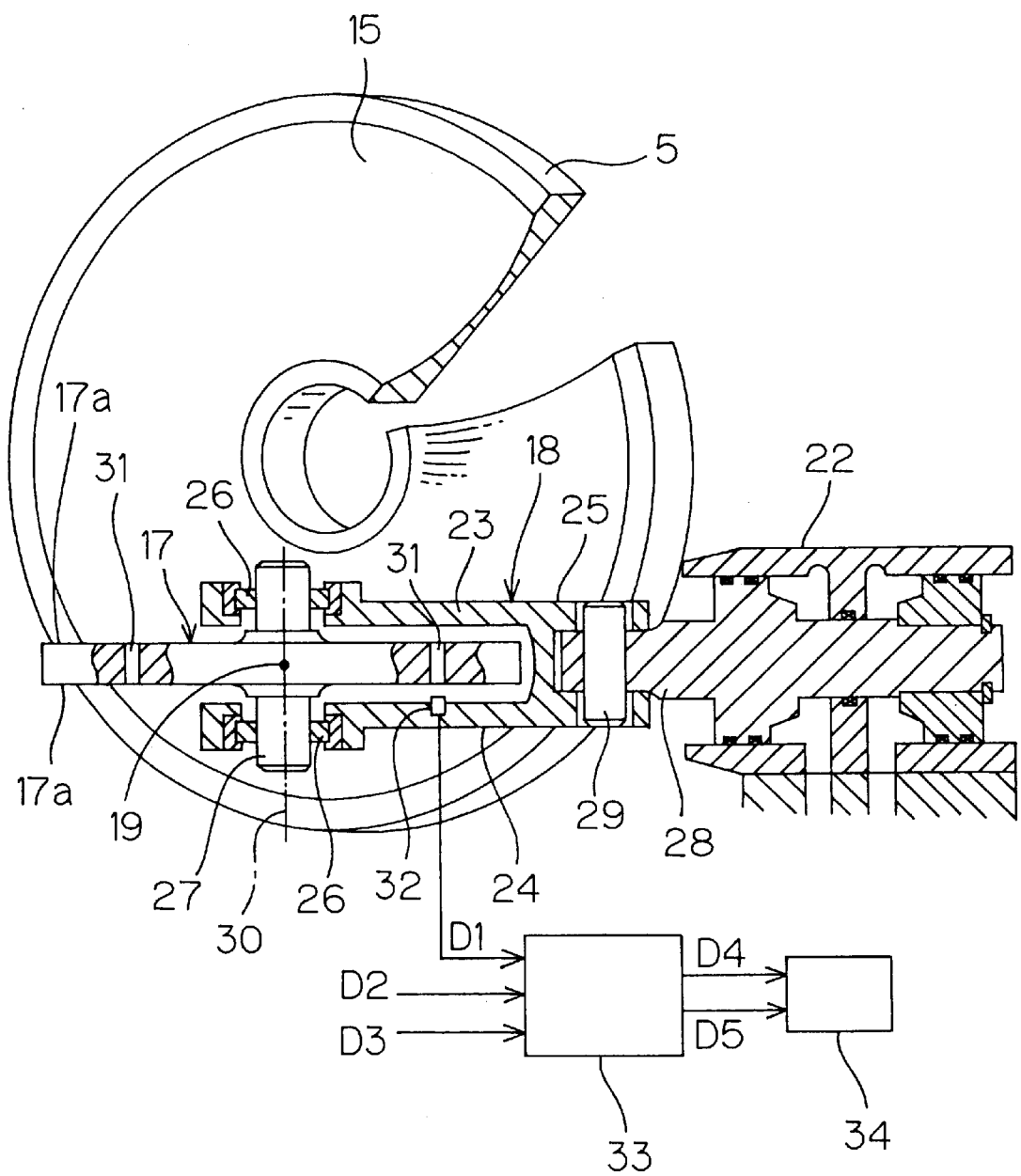
FIG. 2 is a partly broken schematic view in perspective showing an essential part of the toroidal type continuously variable transmission.

Next referring to FIG. 2, the carriage 18 has a U-shape in section, including a pair of side plates 23, 24 confronting a pair of side faces 17a of the roller 17 via a respective predetermined clearance therebetween, and a connection portion 25 confronting a part of the circumference of the roller 17 via a predetermined clearance therebetween and interconnecting proximal ends of the side plates 23, 24.

A distal end of each side plate 23, 24 rotatably carries each corresponding end of a rotary shaft 27 of the roller 17 via a roll bearing 26. The connection portion 25 of the carriage 18 is rotatably connected to a distal end of a piston rod 28 of the hydraulic cylinder 22 via a coupling shaft 29.

Figure 3:
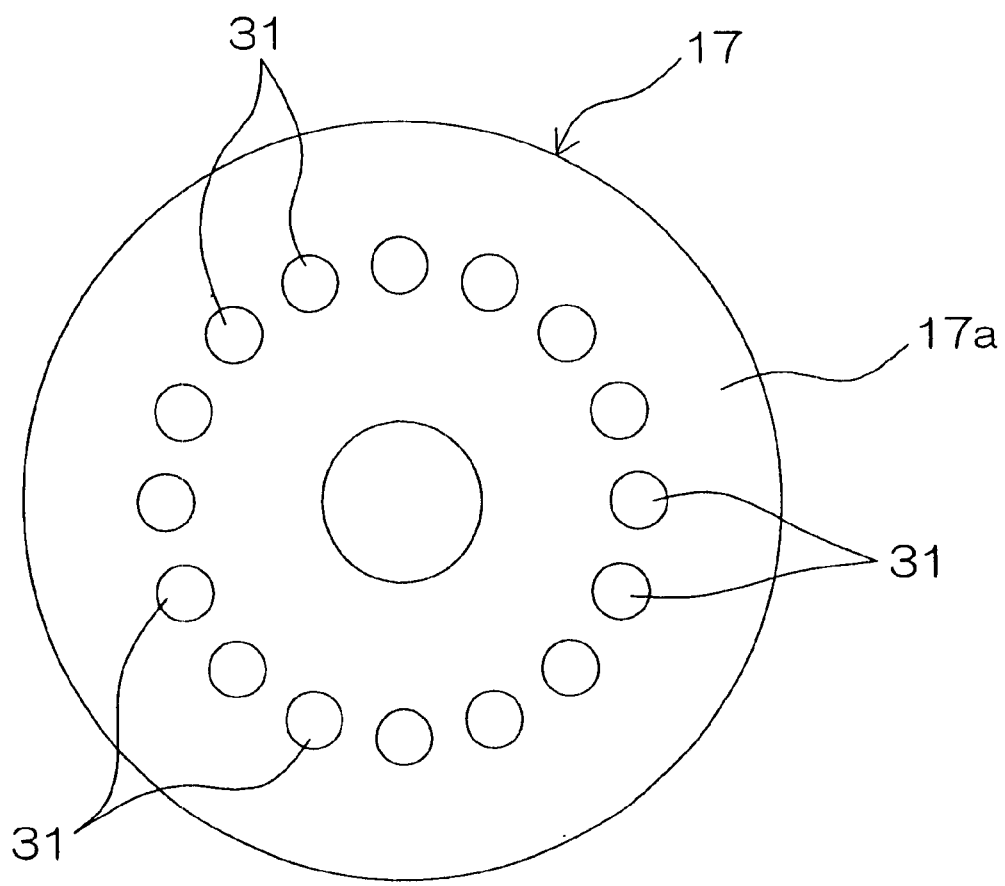
FIG. 3 a side view showing a roller.

Referring to FIGS. 2 and 3, the side face 17a of the roller 17 is formed with a plurality of through holes 31 extended through the roller 17 in parallel with a rotary axis 30 thereof. The through holes 31 are arranged with equal spacing and along a circumference about the rotary axis 30 of the roller 17.

An electromagnetic speed sensor 32 is retained by one 24 of the side plates of the carriage 18 as located at place to face the through hole 31. The speed sensor 32 outputs a signal D1 according to the change of magnetic flux due to the rotation of the roller 17. A control unit 33 as a signal output means receives this signal to calculate a rotary velocity V1 of the roller 17.

On the other hand, the control unit 33 receives a signal D2 representative of a rotary velocity of a vehicular drive source and a signal D3 representative of a rotary velocity of the wheels as the final output velocity from unillustrated sensors. The control unit 33 calculates a rotary velocity V2 of the input discs 5, 6 based on the former signal D2 and a rotary velocity V3 of the output disc 10 based on the latter signal D3. The signals from the speed sensors are in the digital form and supplied to the control unit 33 via sensor circuitry not shown.

Next, operations of the control unit 33 monitoring the slip ratio of the roller 17 will be described with reference to FIG. 4. First, individual data items are initialized by setting a flag F to 0 (step S1). Subsequently, the signals D1, D2 and D3 from the speed sensors are inputted (Step S2) and then the rotary velocities V1, V2 and V3 of the roller 17, input discs 5, 6 and output disc 10 are calculated based on the input data (Step S3).

Then, the resultant rotary velocities V1, V2 and V3 are used to determine velocities of a contact portion of the input disc 5 (or 6) with the roller 17 and that of the output disc 10 with the roller 17. The slip ratio R of the roller is determined from a difference between the velocities of the roller 17 and the contact portion (Step S4).

For example, a slip ratio R of the roller 17 at the rotary velocity V1 with respect to the output disc 10 at the rotary velocity V3 is a value given by dividing the difference between these velocities (V1−V3) by a mean velocity of these (V1+V3)/2.

If the slip ratio R thus determined exceeds an allowable value Ra, the flag F is set to 1 and then, for example, a signal D4 representative of abnormality is outputted to an annunciator 34 such as an indicator in a vehicular cabin so as to suggest a driver to stop driving (Steps S5 to S7). Subsequently, the control flow returns to Step S2 for continued monitoring of the slip ratio.

If, on the other hand, Step S5 determines the slip ratio R to be less than the allowable value Ra, Step S8 determines whether an alarm is being given or not. If the alarm is being given, the flag F is reset to 0 and a signal D5 for canceling the alarm is outputted (Steps S9, S10). Subsequently, the control flow returns to Step S2 for continued monitoring of the slip ratio. If, on the other hand, the alarm is not being given, the control flow returns directly to Step S2 from Step S8 for continued monitoring of the slip ratio.

Figure 5:
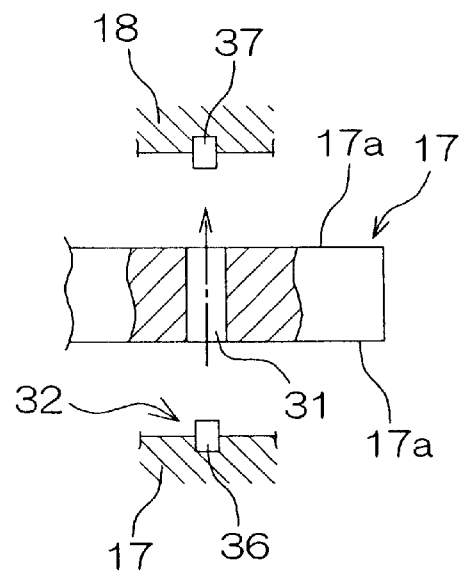
FIG. 5 is a schematic sectional view of the rotary element and a peripheral area thereof for detailed illustration of a speed sensor.

It is noted that the speed sensor 32 may be of a photoelectric type. In this case, a light emitter 36 and a light receptor 37 of the photoelectric speed sensor 32 may each be disposed at both side plates 23, 24 of the carriage 18 sandwiching the roller 17, so that light from the light emitter 36 may pass the through hole 31 to be received by the light receptor 37, as shown in FIG. 5.

According to the embodiment of the invention, the provision of the through holes 31 increases the surface area of the roller 17 whereby the roller 17 is improved in heat releasability. As a result, the heat-up of the roller 17 is prevented. Thus, if the discs 5, 6, 10 and the roller 17 are reduced in size, there is no fear of the flaking of the races 12, 15 which will result from the deterioration of the lubricant. This is also effective to prevent increased temperature of the lubricant at the contact portions between the roller 17 and the discs 5, 6, 10 and hence, traction thereat is prevented from being decreased. Consequently, the greatest possible reduction of the size and weight of the continuously variable transmission A can be practically achieved. In particular, the through holes 31 contribute to a further weight reduction of the roller 17.

The through holes 31 may also be used for sensing the velocity of the roller 17 so that an abnormal slippage of the roller 17 or the like can be detected to warn the driver to stop driving. Thus, the continuously variable transmission A is increased in reliability.

Figure 6A:
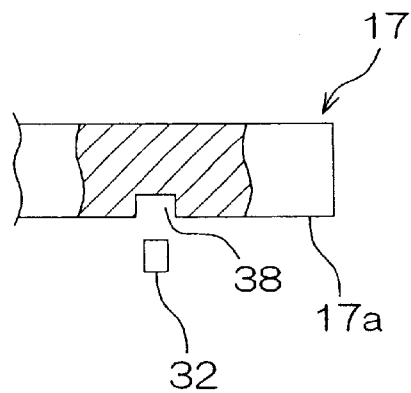
FIGS. 6A and 6B are schematic diagrams each showing the rotary element and the speed sensor for illustration of a modification of the raised/depressed portion formed at the roller.
Figure 6B:
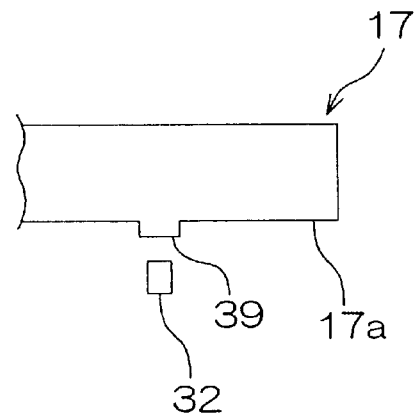

It is to be noted that the invention should not be limited to the above embodiment. For instance, the through hole 31 may be replaced by a recess 38 disposed at one side face 17a of the roller 17, as shown in FIG. 6A or by a projection 39 disposed on one side face 17a of the roller 17, as shown in FIG. 6B.

Figure 7:
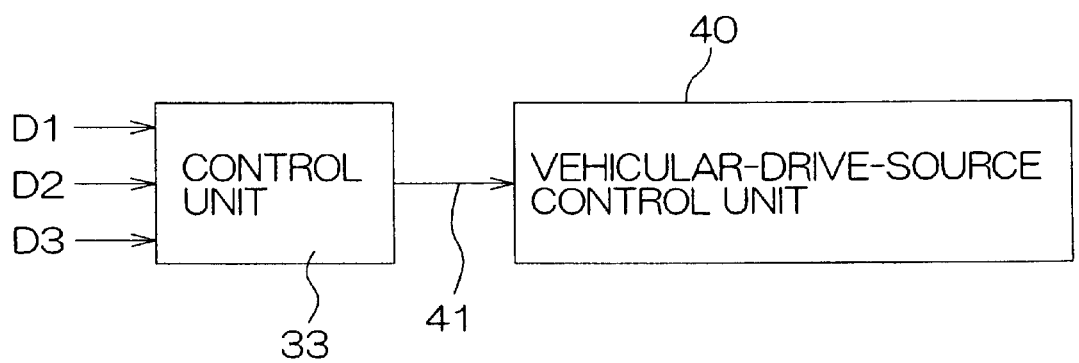
FIG. 7 is a block diagram showing an essential part of an electrical configuration of a toroidal type continuously variable transmission according to another embodiment of the invention.
Figure 8:
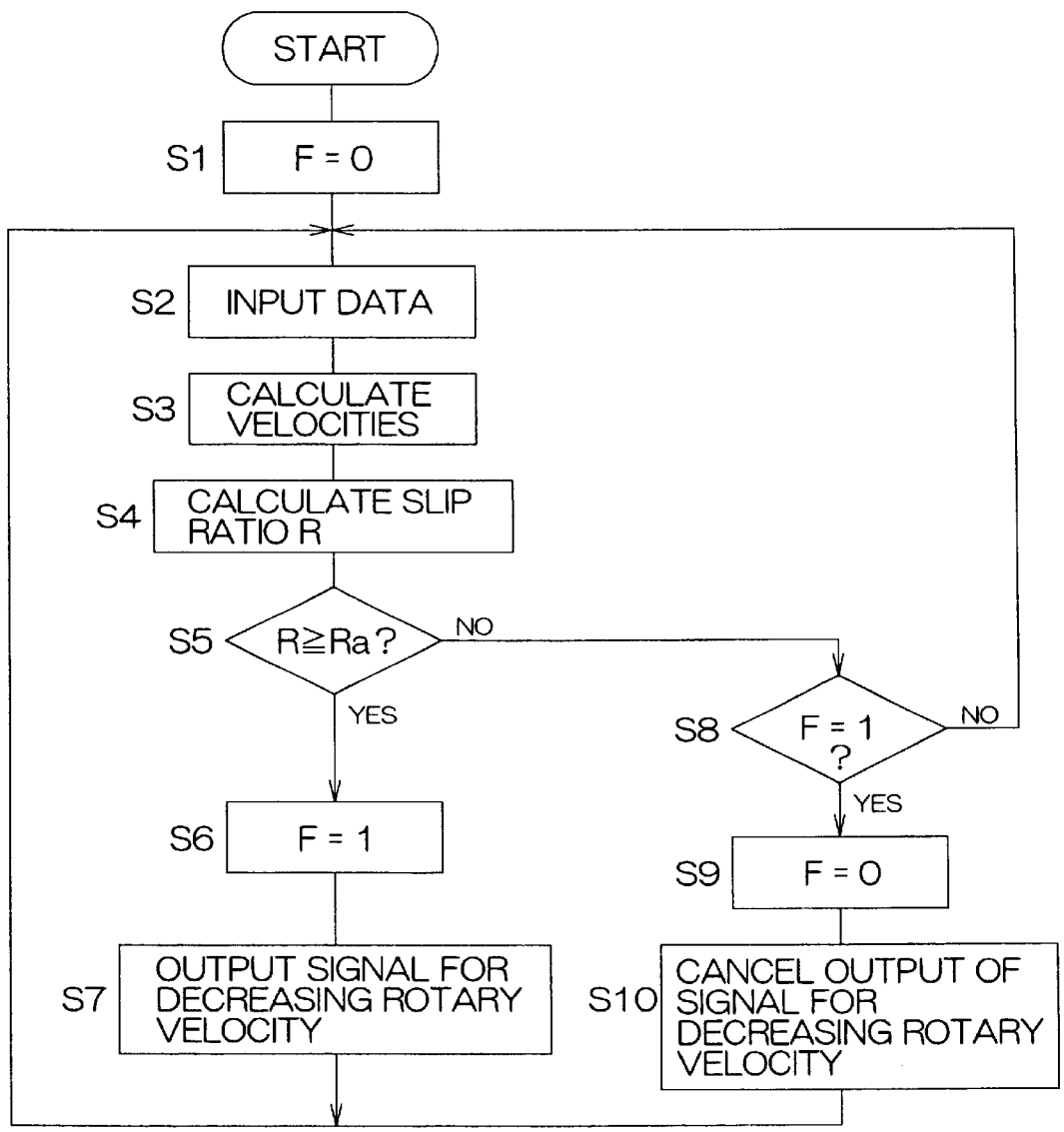
FIG. 8 is a flowchart representing a control flow of the embodiment of FIG. 7.

As shown in FIG. 7, an alternative arrangement may be made such that the control unit 33 receives the signals D1, D2, D3 from the speed sensors and outputs a signal 41 to a vehicular-drive-source control unit 40 for adjustment of the rotary velocity of the vehicular drive source. As shown in FIG. 8, for example, the control unit may output a signal to the vehicular-drive-source control unit 40 for decreasing the rotary velocity of the vehicular drive source when the slip ratio R exceeds the allowable value Ra (Steps S5 to S7). When the slip ratio R is less than the allowable value Ra, the control unit 33 may cancel the output of the signal for decreasing the above rotary velocity (Steps S5 to S10). The other steps of the control flow shown in FIG. 8 are the same as those illustrated in FIG. 4.

Figure 9:
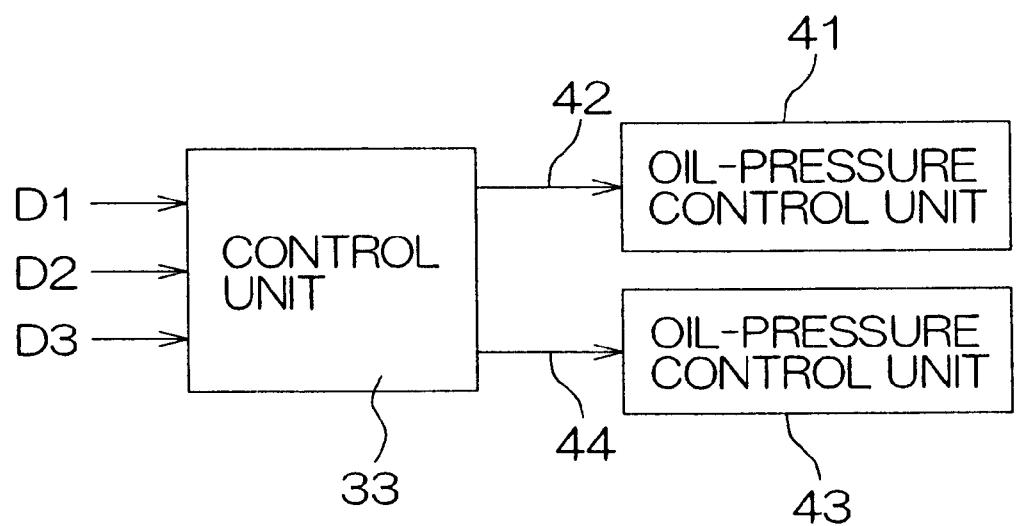
FIG. 9 is a block diagram showing an essential part of an electrical configuration of a toroidal type continuously variable transmission according to another embodiment of the invention.

As shown in FIG. 9, an arrangement may be made such that the control unit 33 receives the signals D1, D2, D3 from the speed sensors and outputs a signal 42 to an oil-pressure control unit 41 for controlling oil pressure supplied to the hydraulic cylinder 9 operative to urge the input discs 5, 6 toward the output disc 10, as well as a signal 44 to an oil-pressure control unit 43 for controlling the hydraulic cylinder 22 operative to urge the roller 17 against the discs 5, 6, 10.

Figure 10:
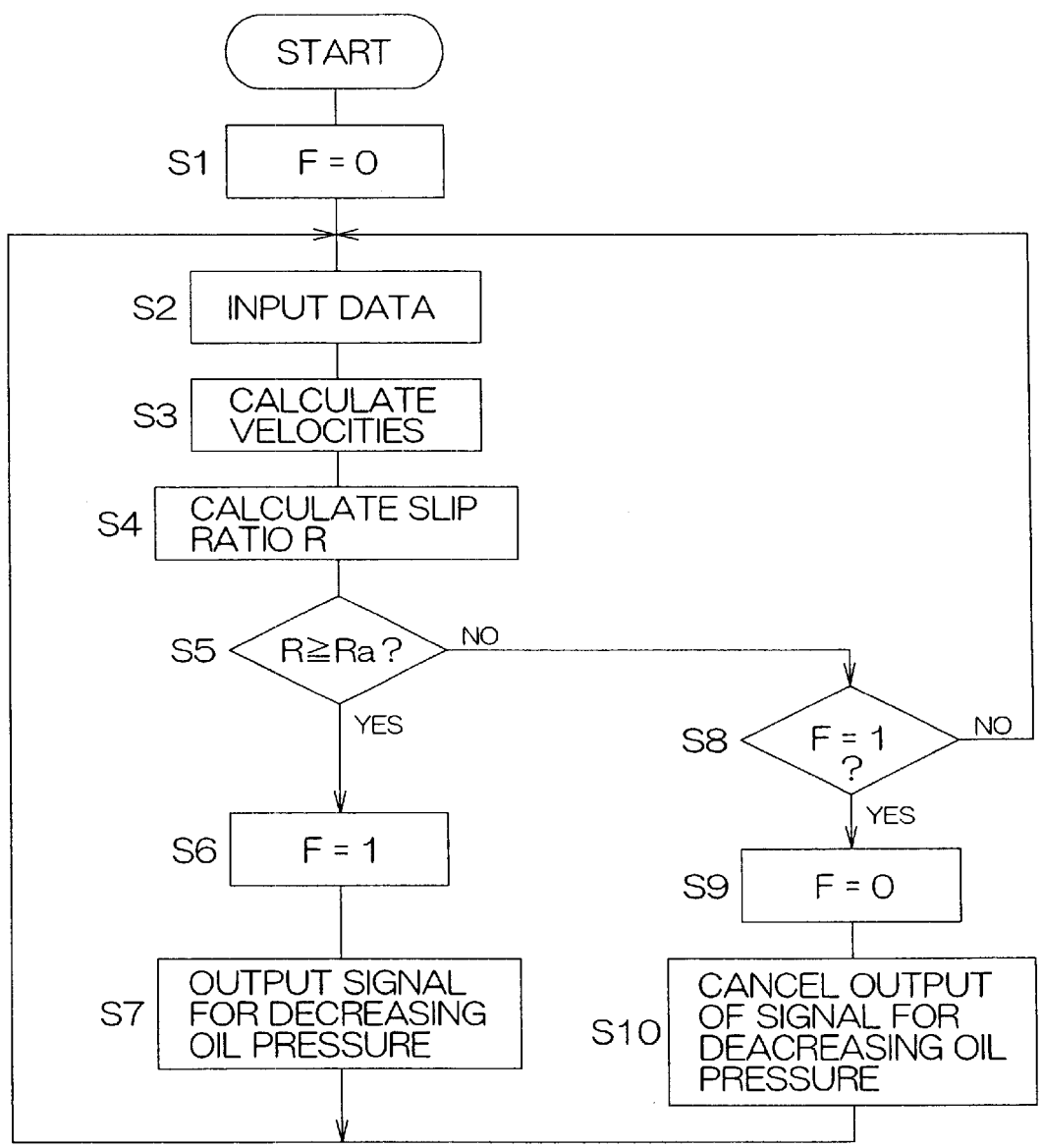
FIG. 10 is a flowchart representing a control flow of the embodiment of FIG. 9.

As shown in FIG. 10, for example, the control unit 33 may output signals to the oil-pressure control units 41, 43 for decreasing the oil pressures when the slip ratio R exceeds the allowable value Ra (Steps S5 to S7). When the slip ratio R is less than the allowable value Ra, the control unit 33 may cancel the output of the signals for decreasing the oil pressures (Steps S5 to S10). The other steps of the control flow shown in FIG. 10 are the same as those illustrated in FIG. 4.

Figure 11A:
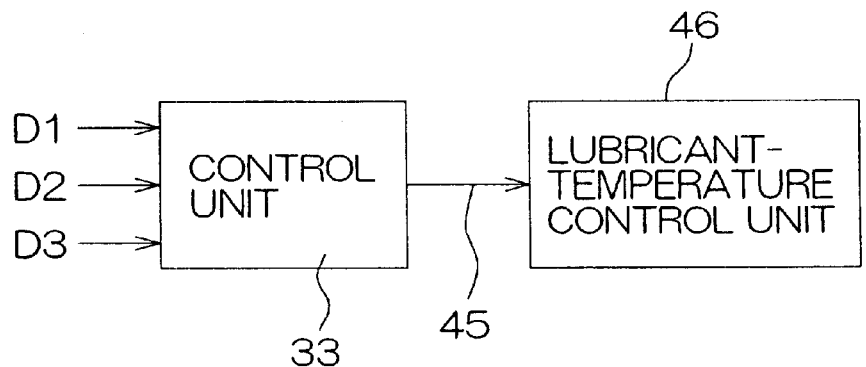
FIGS. 11A, 11B and 11C are block diagrams each showing an essential part of an electrical configuration according to yet another embodiment of the invention.
Figure 11B:
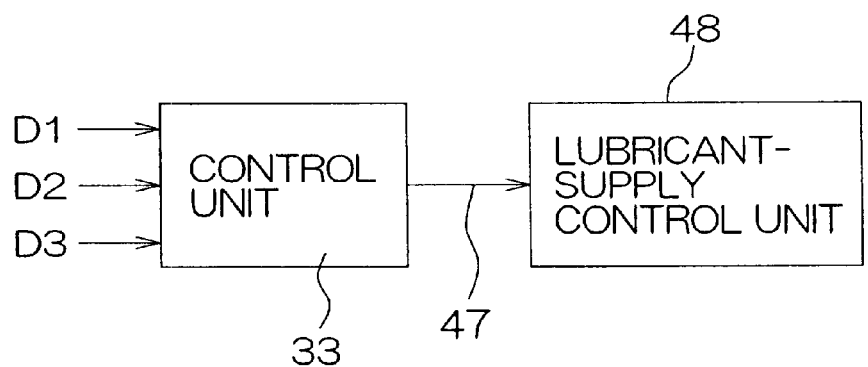
Figure 11C:
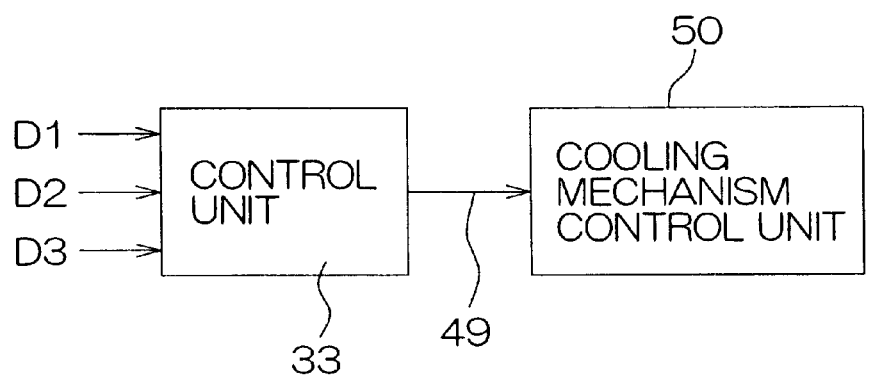

In the embodiments shown in FIGS. 8 and 10, the slip ratio R in excess of Ra is handled by outputting such a signal as to relieve contact conditions for the roller and the discs, the signal including one for decreasing the rotary velocity of the drive source and one for decreasing the oil pressure. However, the invention is not limited to the above. As the signal for relieving the contact conditions when the slip ratio R exceeds Ra, there may be outputted a signal 45 to a lubricant-temperature control unit 46 for lowering the temperature of the lubricant supplied to the contact portion between the roller and the disc, as shown in FIG. 11A, or a signal 47 to a lubricant-supply control unit 48 for increasing the supply of lubricant, as shown in FIG. 11B. As an alternative approach, there may be provided a cooling mechanism for direct cooling of the disc or the roller while a signal 49 may be outputted to a cooling mechanism control unit 50. The cooling mechanism is adapted to supply a coolant to an interior of a rotary shaft of the disc thereby cooling the disc, for example.

The above contact conditions means those which affect the damage, service life, traction, transmissibility, vibrations and the like of the contact portion between the rotary element and the disc, which include contact load, contact surface pressure, relative velocity, temperature and surface roughness at the contact portion, as well as oil film thickness between the contact surfaces, oil film parameter, oil temperature and the like. Thus, the relieving of the above contact conditions means the reduction of the contact load, the relative velocity or the lubricant temperature, or the increase of the lubricant supply for the purposes of preventing the damage on the contact portion and the reduced traction at the contact portion.

Figure 4:
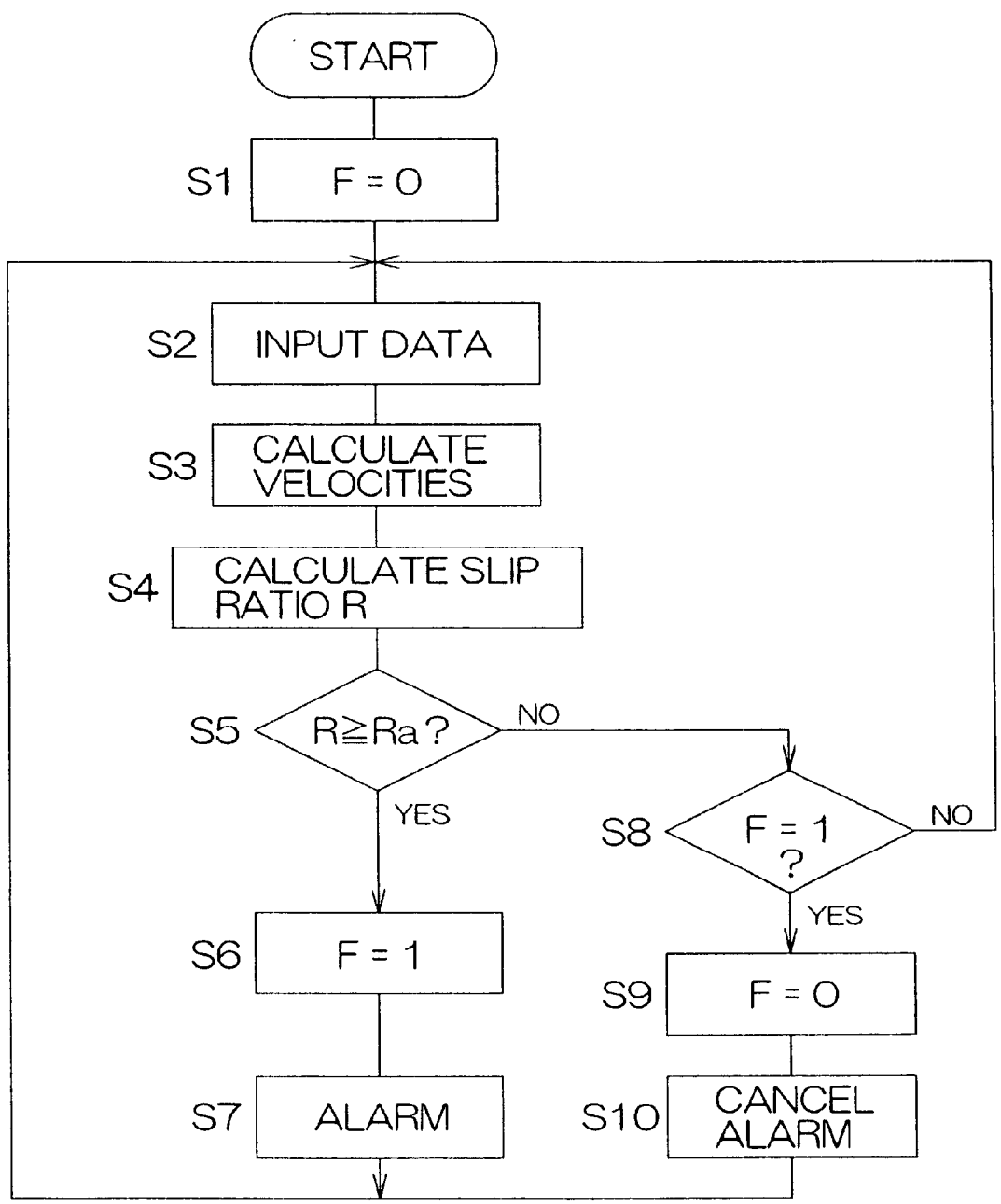
FIG. 4 is a flowchart representing a control flow for monitoring the operations of the roller.

In FIGS. 4, 8 and 10, the slip ratio R is calculated based on the velocities of the roller 17 and the disc 5, 6 or 10 at the contact area thereof, and the resultant slip ratio is used for judging the conditions in which the roller 17 and the disc 5, 6 or 10 are in contact. However, the invention is not limited to this procedure. Instead of the slip ratio R, there may be used, for example, a difference between the velocities of the roller 17 and the disc 5, 6, 10 at its contact area therewith, a velocity ratio, or a value including the velocity difference and the velocity ratio. Otherwise, any value is usable that permits a comparison between the velocities of the roller 17 and the disc 5, 6, 10 at the contact area thereof.

Figure 12:
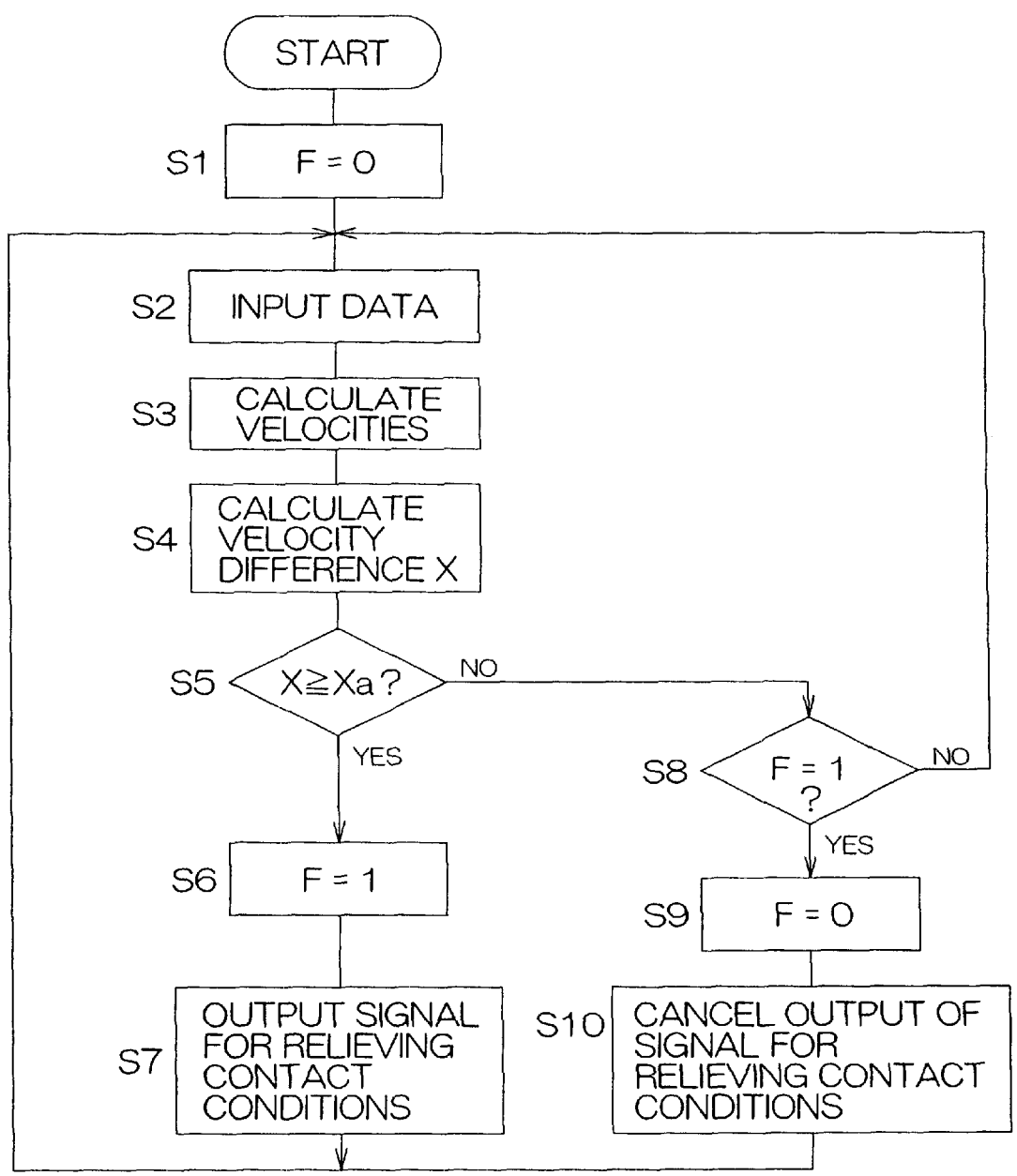
FIG. 12 is a flowchart representing a control flow according to still another embodiment of the invention.

It is possible to take the following procedure as shown in a flowchart of FIG. 12. A velocity ratio X is calculated at Step S4. If Step S5 determines that the velocity ratio X is in excess of a predetermined value Xa, a signal for relieving the contact conditions is outputted (Steps S6 to S7). If the velocity ratio X is less than the predetermined value Xa, the output of the signal for relieving the contact conditions is canceled (Steps S9 to S10). The signal for relieving the contact conditions may include at least one of the aforementioned signals.

The embodiment of FIG. 4 is adapted to provide alarm when the slip ratio R exceeds the allowable value Ra. The embodiments of FIGS. 8, 10, 11A, 11B and 11C are adapted to relieve the contact conditions for the roller 17 and the disc 5, 6 or 10, such as contact pressure therebetween, when the slip ratio R exceeds the allowable value Ra. The embodiment of FIG. 12 is adapted to relieve the contact conditions when the velocity difference X exceeds the predetermined value Xa. It is noted that the invention is not limited to the above. For instance, the signal may be outputted to at least one of the vehicular-drive-source control unit 40, oil-pressure control units 41, 43, lubricant temperature control unit 46, lubricant supply control unit 48 and cooling mechanism control unit 50 such that the contact conditions may be adjusted for restricting the slip ratio R within the predetermined value Ra (or restricting the velocity difference X within the predetermined value Xa).

Other various changes and modifications may be made to the invention within the scope thereof.

What is claimed is:

1. A continuously variable transmission, comprising:
   an input disc having a raceway surface;
   an output disc having a raceway surface, with the raceway surface of said input disc being separated from the raceway surface of said output disc so as to define a toroidal clearance therebetween:
   at least one rotary element interposed in the toroidal clearance, the rotary element having a side face having a plurality of predetermined shape portions thereon, the predetermined shape portions increasing a surface area of said rotary element so as to increase a heat dispersion effect of said rotary element;
   at least one carriage rotatably supporting said rotary element;
   an urging member that is adapted to urge said rotary element against both said input disc and said output disc;
   first sensing means for sensing a velocity of said rotary element, said first sensing means being positioned to intermittently face the predetermined shape portions to enable said first sensing means to sense the velocity of said rotary element;
   second sensing means for sensing respective velocities of said input disc and said output disc; and
   means for comparing the velocity of said rotary element with the respective velocities of said input disc and said output disc, as determined at a contact area between said rotary element and said input disc and said output disc, and outputting a signal based on a compared result, whereby based on the signal, an urging force of the urging member is adjusted.

2. A continuously variable transmission as claimed in claim 1, wherein the urging member comprises a hydraulic actuator; and the signal causes hydraulic power supplied to the hydraulic actuator to be adjusted.

3. A continuously variable transmission as claimed in claim 1, wherein the predetermined shape portions include at least one of depressed portions and raised portions.

4. A continuously variable transmission as claimed in claim 1, wherein the predetermined shape portions include through holes.

5. A continuously variable transmission as claimed in claim 1, wherein the predetermined shape portions are arranged with equal spacing along a circumference and about a rotary axis of said rotary element.

6. A continuously variable transmission as claimed in claim 1, wherein said at least one rotary element comprises a plurality of rotary elements interposed in the toroidal space, and wherein said at least one carriage comprises a plurality of carriages, each rotatably supporting a respective one of said rotary elements.

7. A continuously variable transmission, comprising:
   an input disc having a raceway surface;
   an output disc having a raceway surface, with the raceway surface of said input disc being separated from the raceway surface of said output disc so as to define a toroidal clearance therebetween:
   at least one rotary element interposed in the toroidal clearance;
   at least one carriage rotatably supporting said rotary element;
   an urging member that is adapted to urge said rotary element against both said input disc and said output disc using said carriage;
   first sensing means for sensing a velocity of said rotary element;
   second sensing means for sensing respective velocities of said input disc and said output disc; and
   means for comparing the velocity of said rotary element with the respective velocities of said input disc and said output disc, as determined at a contact area between said rotary element and said input disc and said output disc, and outputting a signal based on a compared result, whereby based on the signal, at least one of a temperature and an amount of lubricant supplied to the contact area between said rotary element and said input disc and said output disc, is adjusted.

8. A continuously variable transmission as claimed in claim 7, wherein a side face of said rotary element is provided with a plurality of predetermined shape portions, the predetermined shape portions being intermittently faced by said first sensing means to enable said first sensing means to sense the velocity of said rotary element, the predetermined shape portions increasing a surface area of said rotary element so as to increase a heat dispersion effect of said rotary element.

9. A continuously variable transmission as claimed in claim 8, wherein the predetermined shape portions include at least one of depressed portions and raised portions.

10. A continuously variable transmission as claimed in claim 8, wherein the predetermined shape portions include through holes.

11. A continuously variable transmission as claimed in claim 8, wherein the predetermined shape portions are arranged with equal spacing along a circumference and about a rotary axis of said rotary element.

12. A continuously variable transmission as claimed in claim 7, wherein said at least one rotary element comprises a plurality of rotary elements interposed in the toroidal space, and wherein said at least one carriage comprises a plurality of carriages, each rotatably supporting a respective one of said rotary elements.

13. A continuously variable transmission as claimed in claim 7, wherein said at least one rotary element comprises a plurality of rotary elements interposed in the toroidal space, and wherein said at least one carriage comprises a plurality of carriages, each rotatably supporting a respective one of said rotary elements.

14. A continuously variable transmission, comprising:

an input disc having a raceway surface;

an output disc having a raceway surface, with the raceway surface of said input disc being separated from the raceway surface of said output disc so as to define a toroidal clearance therebetween:

at least one rotary element interposed in the toroidal clearance;

at least one carriage rotatably supporting said rotary element;

an urging member that is adapted to change an orientation of said rotary element relative to said input disc and said output disc using said carriage to urge said rotary element against said input disc and said output disc;

first sensing means for sensing a velocity of said rotary element;

second sensing means for sensing respective velocities of said input disc and said output disc; and means for comparing the velocity of said rotary element with the respective velocities of said input disc and said output disc, as determined at a contact area between said rotary element and said input disc and said output disc, and outputting a signal based on a compared result, whereby based on the signal, an urging force of the urging member is adjusted to change the orientation of said rotary element.

* * * * *